March 11, 1952     F. B. WRIGHT     2,588,787
EGG DRIER
Filed May 2, 1947     2 SHEETS—SHEET 1
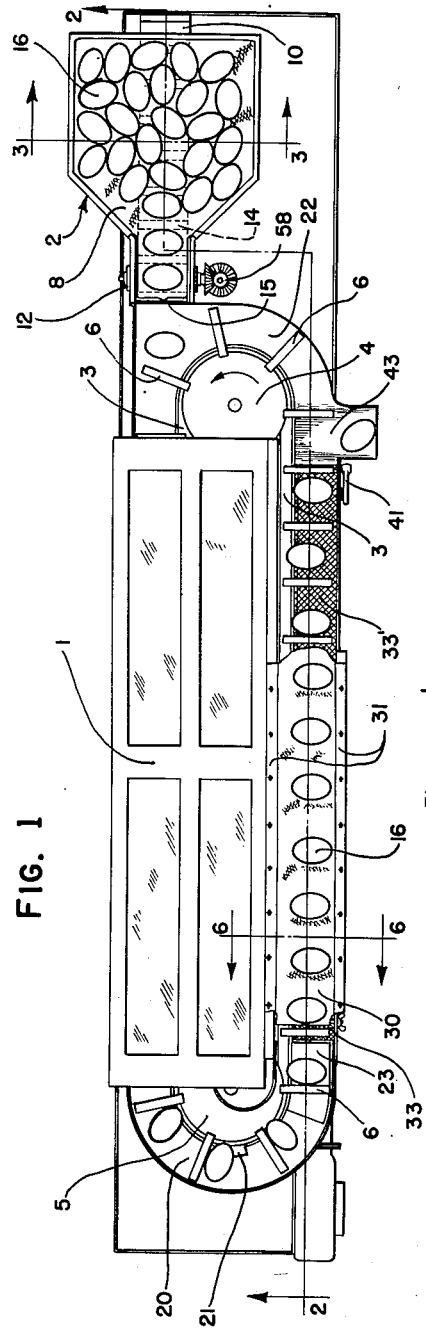
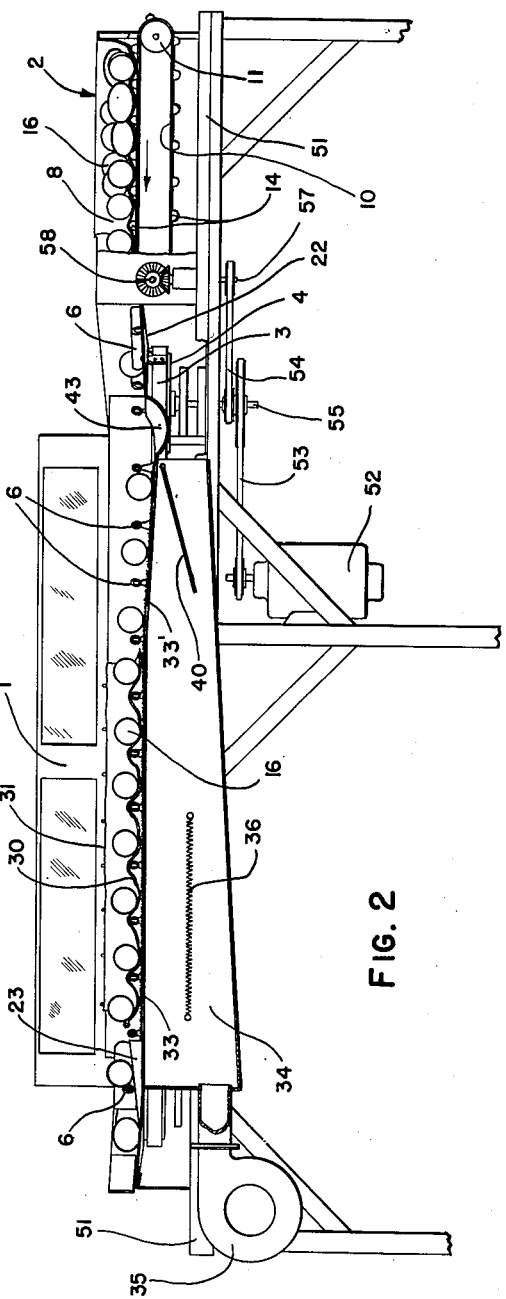
INVENTOR.
FORREST B. WRIGHT
BY
ATTORNEY March 11, 1952 F. B. WRIGHT 2,588,787
EGG DRIER
Filed May 2, 1947 2 SHEETS—SHEET 2
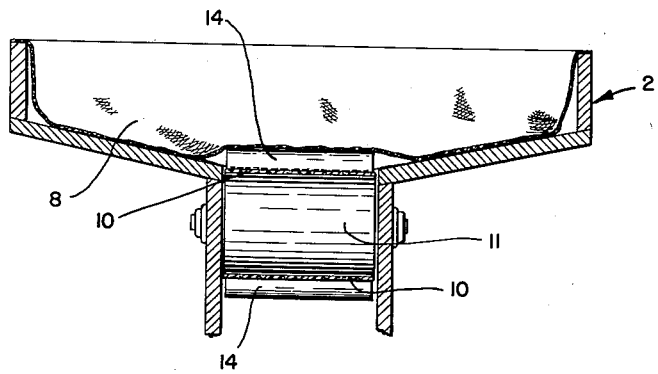
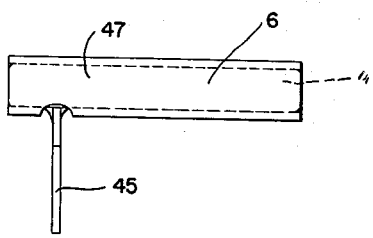
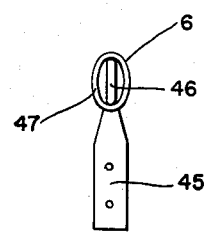
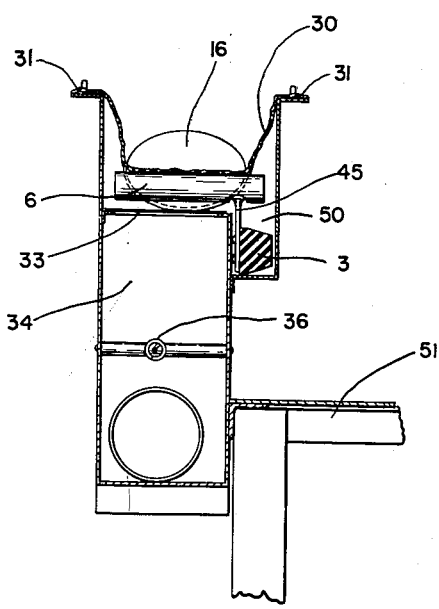
INVENTOR.
FORREST B. WRIGHT
BY
ATTORNEY Patented Mar. 11, 1952

2,588,787

UNITED STATES PATENT OFFICE 2,588,787

EGG DRIER

Forrest B. Wright, Ithaca, N. Y., assignor, by mesne assignments, to Research Corporation, New York, N. Y., a corporation of New York Application May 2, 1947, Serial No. 745,547

4 Claims. (Cl. 34—71)

This invention relates to the conveying and drying of eggs and other objects involving continuous operations in large quantities. While applicable to such relatively solid articles as fruits, vegetables, and natural and manufactured products ordinarily handled, it has been developed to a degree of refinement which makes it particularly applicable to even such fragile objects as fresh eggs for example.

One of the objects of this invention is to rapidly and thoroughly dry eggs as they come from a mechanical washer. Another object is to rearrange quantities of similarly shaped articles of any description so that their major axes are made to become substantially parallel, in preparation for automatic washing, drying, packing or other processing, as in many operations it is desirable that articles arriving at random be positioned in a systematic way. An additional object is to dipose of any broken eggs before they reach the drier. Various other objects will become apparent as the description proceeds. In general, it is desired to attain these objects in a simple and practical mechanism of moderate cost.

Referring now to the drawings illustrating one embodiment of the invention,

Fig. 1 is a plan view of the drier as applied to an automatic egg washing machine.

Fig. 2 is a front elevation view of the same partly in section on the line 2—2 of Fig. 1.

Fig. 3 is a cross-section taken on the line 3—3 of Fig. 1 showing the construction of the automatic supply tray.

Fig. 4 is a side view of a finger of the conveyor belt.

Fig. 5 is an end view of the same.

Fig. 6 is a cross-sectional view taken on the line 6—6 of Fig. 1 showing the action of the drier towel.

Similar reference numerals refer to similar parts thruout the various views.

Referring first to Fig. 1 and Fig. 2, the drier and automatic supply tray are shown as applied to an automatic washing machine 1 of any suitable design, such as shown for example in my copending application Serial No. 726,188, Egg Washer, filed February 3, 1947 now Patent #2,566,475. The present invention is concerned particularly with the drying and the automatic supplying mechanisms, both of which are of general application wherever similar problems arise. The eggs or other objects to be washed and dried are fed into the machine by the automatic supply tray 2 shown at the right of the figures and are conveyed around thru the washing and drying mechanism by means of the conveyor belt 3 mounted on the two pulleys 4 and 5. The belt 3 is provided with suitable lugs or fingers 6 to move the eggs along. A somewhat similar conveyor is provided in the automatic supply tray 2 as will be described more in detail. In the preferred form shown the same belt 3 serves both the washer and the drier, in the interests of compactness, but it will be understood that the drier may have an individual conveyor drive if desired.

One of the problems in handling large quantities of any irregular objects such as eggs, which may be dumped in at random, is to arrange them in the proper position for processing by machinery, without involving additional manual labor. This is accomplished in the present invention by the use of the automatic supply tray 2 having a flexible bottom 8 made of fabric, plastic or rubber, or any suitable material that will bend easily. As shown more particularly in Fig. 3, this flexible material 8 is attached to the top edges of the tray 2 and lies loosely in the bottom of the tray, sloping down toward the center. In this the eggs may be placed at random as shown in Fig. 1 and Fig. 2. Underneath the fabric 8, and running along the middle of the tray, is a conveyor belt 10 on pulleys 11 and 12, as best seen in Fig. 1 and Fig. 2. This conveyor belt 10 is provided with projecting lugs or fingers 14 which travel under the surface of the apron 8 and cause it to undulate in waves moving in the direction of the outlet 15. Even though the eggs 16 are originally in random positions as shown in Fig. 1, these undulations of the apron 8 cause them to gradually assume positions parallel to the underlying cleats 14, so that when they leave the outlet 15 they are substantially parallel and in proper position to be picked up by the conveyor belt 3. This method of positioning may be applied to any non-spherical objects and is particularly useful with eggs.

The eggs thus positioned are picked up by the fingers 6 on the conveyor belt 3, carried thru the washing machine 1, and emerge at the left as shown in Fig. 1 and Fig. 2 in a wet condition so that they must be promptly dried to maintain a continuous process. As they roll around the pulley 5 the track 20 is slightly banked to keep them on the inside, and an opening 21 is provided therein thru which any broken egg may be drained, so as not to soil toweling of the drier. The track 22 around the pulley 4 at the right hand end of the machine is similarly banked but need not be provided with a drainage slot.

After passing around the pulley 5 the egg 16 is rolled up a short incline 23 as shown in Fig. 2, a slight twisting of the belt 3 permitting the finger 6 to slide up this incline 23 also. At the end of the incline 23 the finger 6 drops down to the normal line of travel of the conveyor belt 3 under the fabric toweling 30 while the wet egg 16 rolls over on top of the toweling 30. Then it is carried along by undulations of the toweling 30 induced by the under-travel of the conveyor belt fingers 6 much as the eggs were moved by the undulations of the apron 8 in the supply tray 2. However, there are some special problems and functions associated with the drying towel 30 which are not present in the original positioning at the receiving end.

In the past it has been fairly easy to remove almost all of the water from the surface of an egg by merely rolling it over a blast of warm air. But the difficulty in rapid processing has been to remove the last small drop, which as its area diminished tended to evaporate rather slowly. It was also necessary to be sure to dry all sides and the ends. To accomplish this the toweling 30 is curved down rather loosely and fastened at the sides 31 as shown in Fig. 6 and Fig. 1, so that it contacts the ends and partially envelopes the egg 16. The lower part of the toweling 30 rests on a wire mesh screen 33 on the top of the hot air box 34 into which a blast of warm air is blown by the blower 35 and further heated by the electric heating element 36. This heated air flows up thru the wire mesh 33 and porous toweling 30 continuously carrying away the moisture that the toweling absorbs from the surfaces of the eggs. The toweling 30 extends partway along the drying channel, but before the egg has left the toweling it is almost dry, and a brief exposure to the stream of hot air coming thru the uncovered wire mesh 33' at the right hand end of the drying channel in Fig. 1 is sufficient to completely dry it. A damper or deflector 40 operated by the handle 41 in the end of the air box 34 under the open wire mesh 33' permits the relative amount of air flow between the toweling 30 and uncovered mesh 33' to be adjusted in any desired proportion. After the egg has been thus dried it rolls out the trough 43 to the grader or packer or whatever is the next process.

Various forms of fingers or lugs on the conveyor belt 3 may be used, one preferred type being shown in detail in Fig. 4, Fig. 5 and Fig. 6. As shown in Fig. 4 and Fig. 5, it may consist of a metal bracket 45 having an extension 46 which is surrounded by a rubber tube 47 so as not to break the eggs. This finger or lug unit 6 when assembled is riveted to the side of the V belt 3 as shown in Fig. 6, the belt travelling in an appropriate slot or groove 50 along the side of the air box 34 but being capable of twisting slightly so that the finger may adapt itself to the angle of the banked curves or the inclined plane described previously.

The entire mechanism is mounted on a suitable frame or table 51 and is driven by an electric motor 52 or other power thru the transmission belts 53 and 54. The belt 53 drives the vertical shaft 55 on which is mounted the conveyor pulley 4 driving the conveyor belt 3; and the additional transmission belt 54 drives the vertical shaft 57, which thru the bevel gearing 58 moves the conveyor belt 10 on the pulleys 11 and 12, to maneuver the eggs into the proper position at the start.

While I have in the foregoing described certain specific forms by way of example, it will be understood that they are merely for purposes of illustration to make clear the principles of the invention, which is not limited to the particular forms shown, but is susceptible to various modifications and adaptations in different installations as will be apparent to those skilled in the art without departing from the scope of the invention as stated in the following claims.

I claim:

1. Means for positioning quantities of similarly shaped objects, comprising in combination a tray having a flexible bottom, and a conveyor belt having projections travelling under the surface of said bottom so as to cause it to undulate in waves travelling in the same direction as the conveyor belt, the flexible bottom of said tray extending laterally beyond the sides of the conveyor belt and being inclined downward toward the undulating portion so that the objects first roll in different directions toward the belt without undulating until they come gradually under the influence of the undulating portion, whereby when similarly shaped objects are placed on the tray at random they are induced to gradually assume positions with their major axes substantially parallel.

2. In a drier, the combination of a drying air box, a conveyor having projections and openings between the projections, said conveyor passing over said box, a porous flexible covering supporting the objects to be dried and extending over one portion of the conveyor so as to be undulated by its projections, the drying air passing thru the openings in the conveyor and thru the flexible covering, a succeeding uncovered portion of the conveyor thru which the drying air also passes, and means for regulating the proportions of air that pass thru the covered and the uncovered parts of the conveyor.

3. A positioning and conveying device comprising a conveyor mechanism including a generally horizontally extending top flight having spaced members projecting upwardly therefrom, drive means for said conveyor mechanism, and a flexible web member positioned above at least a portion of the top flight of said conveyor mechanism, said web member being suspended from opposite edges thereof in the form of a trough extending along said top flight, the median portion of the trough being in contact with said spaced projecting members whereby movement of the conveyor mechanism causes the progression of undulations along the median portion of the trough.

4. In a drier, a conveyor mechanism including a generally horizontally extending top flight having spaced members projecting upwardly therefrom, drive means for said conveyor mechanism, a porous flexible web member positioned above at least a portion of the top flight of said conveyor mechanism, said web member being suspended from opposite edges thereof in the form of a trough extending along said top flight, the median portion of the trough being in contact with said spaced projecting members whereby movement of the conveyor mechanism causes the progression of undulations along the median portion of the trough, and means for passing air upwardly through said top flight and said web member.

FORREST B. WRIGHT.

REFERENCES CITED

The following references are of record in the file of this patent:

UNITED STATES PATENTS

| Number | Name | Date |
| --- | --- | --- |
| 697,360 | Pettit | Apr. 8, 1902 |
| 995,282 | Parker | June 13, 1911 |
| 1,019,959 | Hannam et al. | Mar. 12, 1912 |
| 1,078,110 | Stamm | Nov. 11, 1913 |
| 1,530,415 | Rousel | Mar. 17, 1925 |
| 1,546,180 | Osborn | July 14, 1925 |
| 1,618,159 | Ahlburg | Feb. 22, 1927 |
| 1,884,344 | Stevens et al. | Oct. 25, 1932 |
| 2,052,001 | Platt | Aug. 25, 1936 |
| 2,159,047 | Paxton et al. | May 23, 1939 |